A. E. WHITTIER.
OVEN THERMOMETER.
APPLICATION FILED NOV. 3, 1916.
1,235,623.
Patented Aug. 7, 1917.
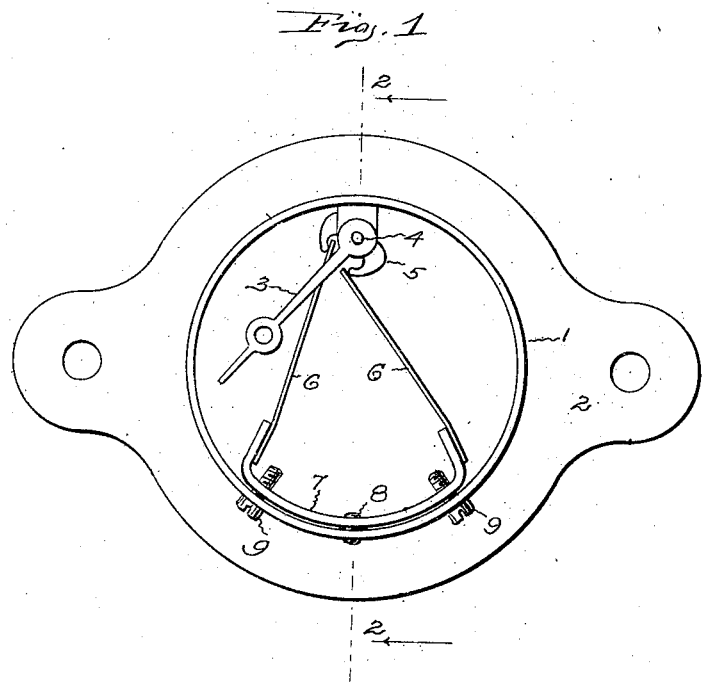
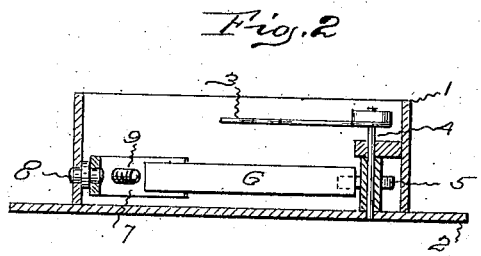
INVENTOR.
Albert E. Whittier
BY
Harry P. Williams
ATTORNEY.

UNITED STATES PATENT OFFICE.

ALBERT E. WHITTIER, OF BRISTOL, CONNECTICUT.

OVEN-THERMOMETER.

1,235,623. Specification of Letters Patent. Patented Aug. 7, 1917.

Application filed November 3, 1916. Serial No. 129,300.

*To all whom it may concern:*

Be it known that I, ALBERT E. WHITTIER, a citizen of the United States, residing at Bristol, in the county of Hartford and State of Connecticut, have invented a new and useful Improvement in Oven-Thermometers, of which the following is a specification.

This invention relates to those devices which are designed to be placed in openings in the doors or walls of baking ovens and similar heating or drying chambers for the purpose of indicating on the outside the temperature in the interior.

The object of this invention is to produce a very simple, cheap and efficient device with the parts so arranged that the action of the thermo-responsive arms upon the indicating pointer may at any time, without opening the thermometer, be readily adjusted so that the pointer will accurately indicate the temperature.

The invention is illustrated and described herein in connection with a thermometer of the type shown in Patent No. 1,151,638 granted to me August 31st, 1915. Figure 1 of the drawings shows a plan of a thermometer of the type mentioned constructed according to this invention, with the cover and dial omitted so as to show the interior. Fig. 2 shows a section on the plane indicated by the dotted line 2—2 on Fig. 1.

These thermometers usually have a circular casing 1 which is designed to fit an opening through the wall of the oven, and a back plate 2 of thin sheet metal adapted to be fastened to the inside of the wall of the oven. In the form of thermometer illustrated in the drawings the pointer 3 is fastened to one end of a spindle 4 which is mounted in the casing near one side so that as the spindle is turned the pointer swings. Fastened to the spindle is a pallet 5 engaging with the horns of which are the free ends of two thin arms 6 made of common thermometric metal so that they warp when heated. The free ends of these thermo-responsive arms extend between the horns of the pallet and press thereagainst in opposite directions, but they are arranged so that they tend to warp and straighten in the same direction as the temperature varies. The ends of the arms only bear loosely against the ends of the pallet, and as the arms warp in the same direction and press oppositely with relation to the rotary movement of the pallet, only one arm at a time acts to turn the pallet, the other arm simply gets out of the way. This arrangement permits of a very simple construction which is exceedingly sensitive, for the sheets from which the thermo-responsive arms are formed may be rolled very thin so that they are light and easily influenced by changes of temperature, yet they hold the pointer firmly in all positions.

The outer or relatively fixed ends of the thermo-responsive arms are fastened to the ends of a yoke 7. This yoke is desirably mounted on a stud 8 secured to the casing so that it may be tipped one way or the other as desired. Screws 9 pass through the casing and engage the yoke in such manner that by loosening one screw and tightening the other screw the position of the yoke with relation to the casing may be changed and consequently the pressure or tension of the thermo-responsive arms against the pallet may be altered. As a result of this construction the action of the thermo-responsive arms upon the pallet may be accurately determined, and consequently the pointer adjusted so that it will correctly indicate the temperature in the oven to the wall of which the thermometer is applied, and this adjustment may be accomplished when desirable without taking the thermometer apart.

The invention claimed is:

1. An oven thermometer having a casing, a spindle mounted in the casing, a pointer carried by the spindle, two thermo-responsive arms mounted within the casing, one arm causing the spindle to turn in one direction and the other arm causing the spindle to turn in the opposite direction as the temperature varies, and means on the exterior and extending into the casing for adjusting the action of the thermo-responsive arms on the spindle.

2. An oven thermometer having a casing, a spindle mounted in the casing, a pointer carried by the spindle, two thermo-responsive arms in the casing, one arm causing the spindle to turn in one direction and the other arm causing the spindle to turn in the opposite direction as the temperature varies, a movable mounting supporting the thermo-responsive arms, and screws extending from the exterior through the casing and engaging said mounting for adjusting and securing the same.

3. An oven thermometer having a casing, a spindle mounted in the casing, a pointer carried by the spindle, thermo-responsive arms for turning the spindle as the temperature varies, a yoke supporting the thermo-responsive arms, and screws passing from the exterior through the casing and holding the yoke in such position that the action of the thermo-responsive arms will cause the pointer to correctly indicate the temperature.

4. An oven thermometer having a casing, a spindle mounted in the casing, a pointer carried by the spindle, a yoke loosely mounted within the casing, screws for adjusting and securing the yoke in position, and thermo-responsive means attached to the yoke ends and adapted to turn the spindle as the temperature varies.

5. An oven thermometer having a casing, a spindle mounted in the casing, a pointer carried by the spindle, a pallet fastened to the spindle, a yoke loosely mounted within the casing, screws passing through the casing from the exterior to the interior and engaging the yoke for adjusting it to desired position, and thermo-responsive arms attached to the yoke ends and engaging the pallet on the spindle.

ALBERT E. WHITTIER.